United States Patent
Venugopal et al.

(10) Patent No.: US 12,206,611 B2
(45) Date of Patent: Jan. 21, 2025

(54) MODEL-BASED CHANNEL STATE INFORMATION

(71) Applicant: QUALCOMM Incorporated, San Diego, CA (US)

(72) Inventors: Kiran Venugopal, Raritan, NJ (US); Wooseok Nam, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 17/654,381

(22) Filed: Mar. 10, 2022

(65) Prior Publication Data
US 2023/0291518 A1    Sep. 14, 2023

(51) Int. Cl.
*H04W 64/00*    (2009.01)
*H04L 5/00*    (2006.01)

(52) U.S. Cl.
CPC ......... *H04L 5/0048* (2013.01); *H04W 64/006* (2013.01)

(58) Field of Classification Search
CPC .............. H04L 5/0048; H04W 64/006; H04W 24/08; H04W 74/002; H04B 17/3913
USPC ...................................................... 455/452.1
See application file for complete search history.

(56) References Cited

U.S. PATENT DOCUMENTS

| | | | |
|---|---|---|---|
| 11,329,737 B1 * | 5/2022 | Khafizov | ........... H04B 17/3913 |
| 2013/0028120 A1 | 1/2013 | Sun et al. | |
| 2018/0070258 A1 * | 3/2018 | Sun | ........................ H04W 24/10 |
| 2018/0332483 A1 * | 11/2018 | Yoon | ........................ H04L 5/006 |
| 2021/0143883 A1 | 5/2021 | Yerramalli et al. | |
| 2023/0269115 A1 * | 8/2023 | Bashir | .................. H04B 17/336 |
| | | | 375/262 |

FOREIGN PATENT DOCUMENTS

| | | | | |
|---|---|---|---|---|
| EP | 4044537 A1 | 8/2022 | | |
| WO | WO-2021075889 A1 * | 4/2021 | ........... | H04B 7/0626 |

OTHER PUBLICATIONS

International Search Report and Written Opinion—PCT/US2023/012849—ISA/EPO—May 9, 2023.

* cited by examiner

*Primary Examiner* — Hirdepal Singh
(74) *Attorney, Agent, or Firm* — Procopio, Cory, Hargreaves & Savitch

(57) ABSTRACT

This disclosure provides systems, devices, apparatus, and methods, including computer programs encoded on storage media, for tracking channel variations via a model-based representation of the channel. A first network entity may receive from a second network entity or transmit to the second network entity, a model configuration indicative of a model condition of a channel between the first network entity and the second network entity. The model configuration may be associated with one or more initial parameters. The first network entity may receive a reference signal from the second network entity to measure a condition of the channel between the first network entity and the second network entity, and transmit, to the second network entity, one or more updated parameters for the model configuration based on a measurement of the condition of the channel in comparison to the model condition of the channel based on the model configuration.

27 Claims, 11 Drawing Sheets

MODEL-BASED CHANNEL STATE INFORMATION

TECHNICAL FIELD

The present disclosure relates generally to communication systems, and more particularly, to tracking channel variations and channel state information (CSI).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive from a second network entity or transmit to the second network entity, a model configuration indicative of a model condition of a channel between the first network entity and the second network entity, the model configuration associated with one or more initial parameters; receive a reference signal from the second network entity to measure a condition of the channel between the first network entity and the second network entity; and transmit, to the second network entity, one or more updated parameters for the model configuration based on the measurement of the condition of the channel between the first network entity and the second network entity in comparison to the model condition of the channel based on the model configuration.

In another aspect of the disclosure, a method, a computer-readable medium, and an apparatus are provided. The apparatus may transmit to a first network entity or receive from the first network entity, a model configuration indicative of a model condition of a channel between the first network entity and the second network entity, the model configuration associated with one or more initial parameters; transmit a reference signal to the first network entity for a measurement of a condition of the channel between the first network entity and the second network entity; and receive, from the first network entity, one or more updated parameters for the model configuration based on the measurement of the condition of the channel between the first network entity and the second network entity in comparison to the model condition based on the model configuration.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
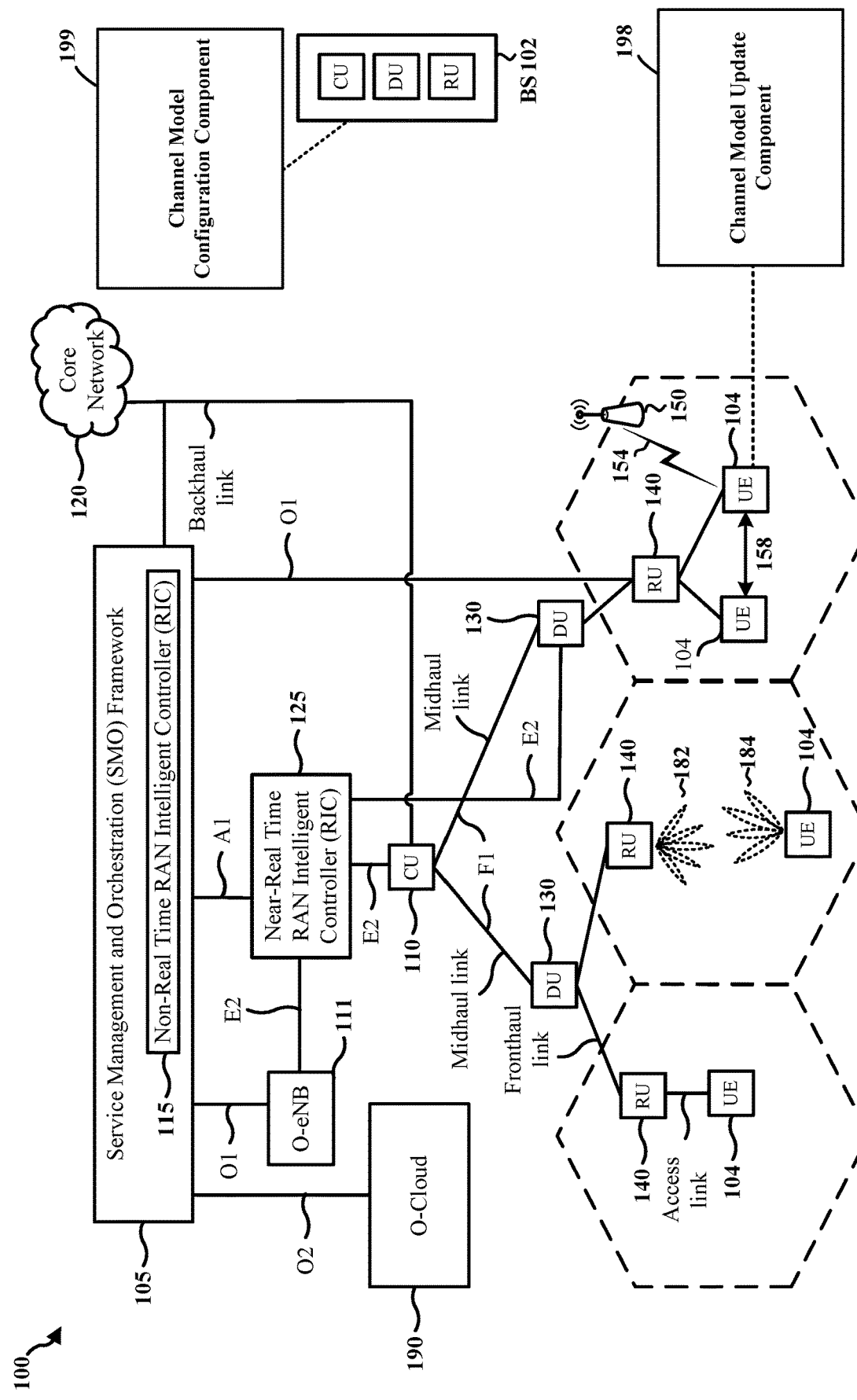
FIG. 1 is a diagram illustrating an example of a wireless communications system and an access network.

The measurement and reporting of channel state information (CSI) may be used to adjust and improve communication, such as communication between a UE and network. In some aspects, such as high mobility situations, performance loss may occur based on channel variations that may occur more frequently than CSI updates. Although the CSI reporting rate can be increased, the increased uplink and downlink CSI overhead may reduce system throughput. Additionally, more frequent reporting uses additional battery power at a UE. Aspects presented herein provide for model based CSI tracking that may address channel variations while also conserving wireless resources and avoiding additional CSI overhead.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a channel model update component 198 configured to receive from a second network entity or transmit to the second network entity, a model configuration indicative of a model condition of a channel between the first network entity and the second network entity, the model configuration associated with one or more initial parameters; receive a reference signal from the second network entity to measure a condition of the channel between the first network entity and the second network entity; and transmit, to the second network entity, one or more updated parameters for the model configuration based on the measurement of the condition of the channel between the first network entity and the second network entity in comparison to the model condition of the channel based on the model configuration. In certain aspects, the base station 102 or a network entity of the base station 102 may include a channel model configuration component 199 configured to transmit to a first network entity or receive from the first network entity, a model configuration indicative of a model condition of a channel between the first network entity and the second network entity, the model configuration associated with one or more initial parameters; transmit a reference signal to the first network entity for a measurement of a condition of the channel between the first network entity and the second network entity; and receive, from the first network entity, one or more updated parameters for the model configuration based on the measurement of the condition of the channel between the first network entity and the second network entity in comparison to the model condition based on the model configuration. Although the following description may be focused on 5G NR, the concepts described herein may be applicable to other similar areas, such as LTE, LTE-A, CDMA, GSM, and other wireless technologies.

Figure 2:
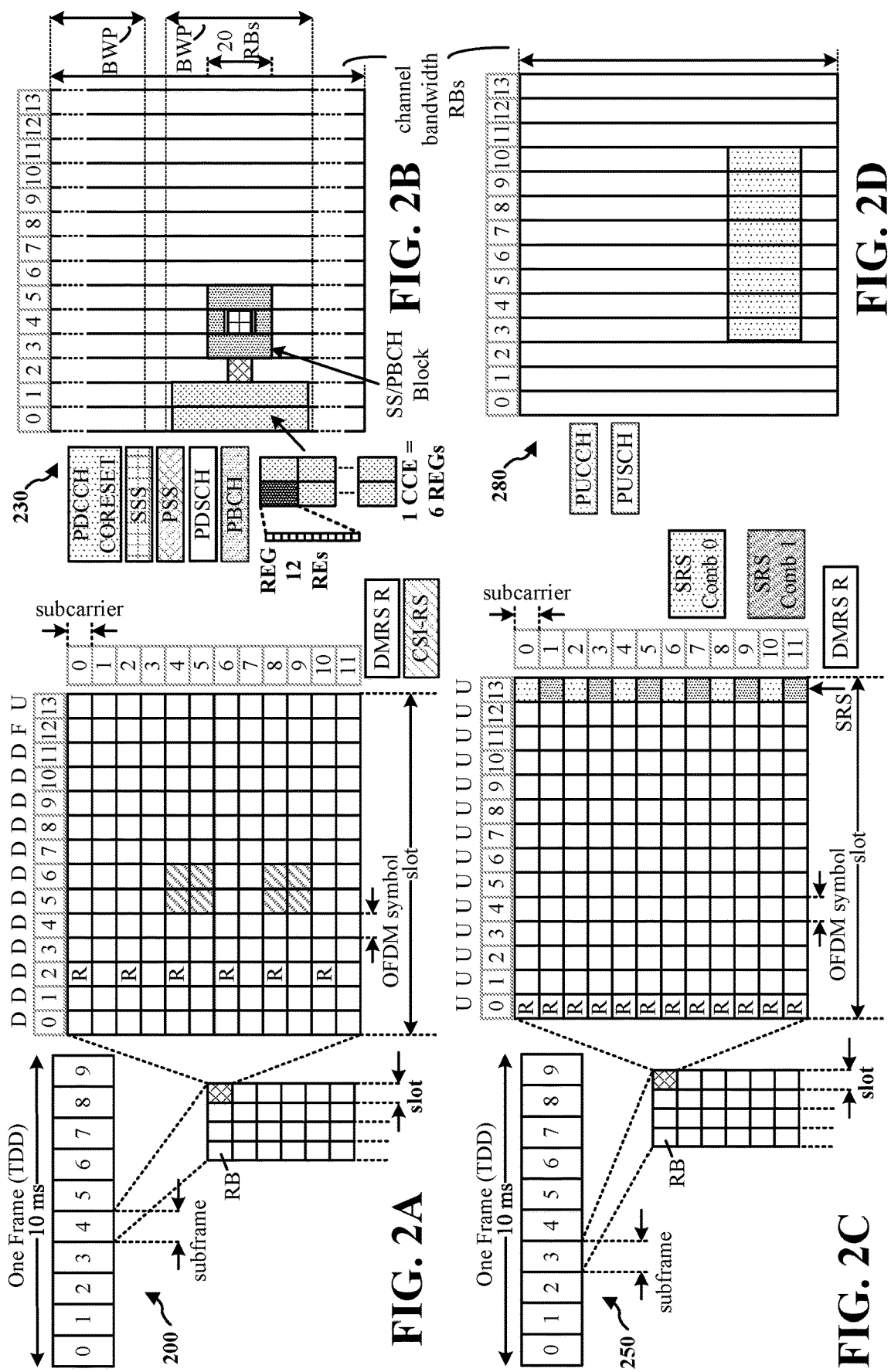
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe.

The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
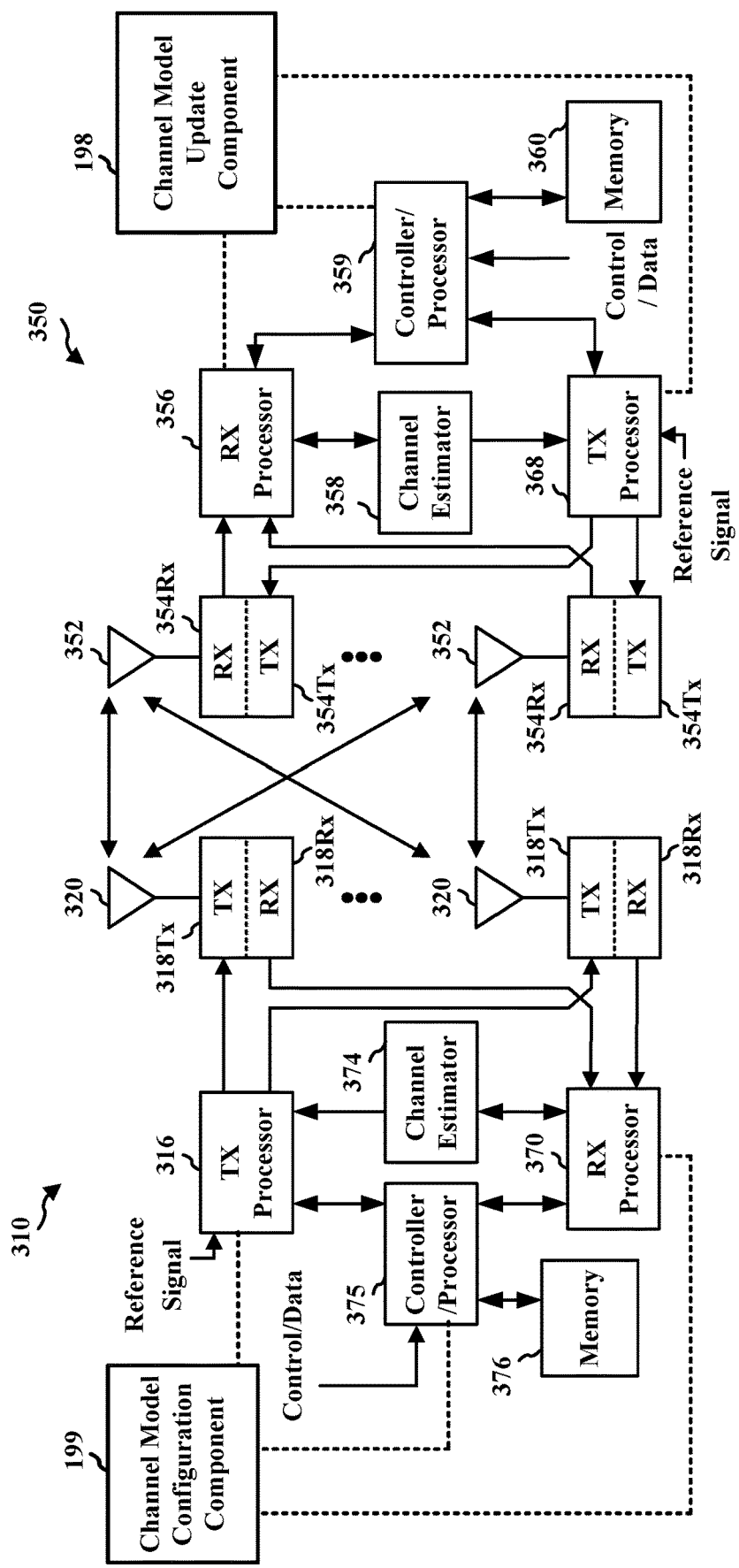
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the channel model update component 198 of FIG. 1.

At least one of the TX processor 316, the RX processor 370, and the controller/processor 375 may be configured to perform aspects in connection with the channel model configuration component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

The measurement and reporting of CSI may be used to adjust and improve communication, such as communication between a UE and network. In some aspects, such as high mobility situations, performance loss may occur based on channel variations that may occur more frequently than CSI updates. Although the CSI reporting rate can be increased, the increased uplink and downlink CSI overhead may reduce system throughput. Additionally, more frequent reporting uses additional battery power at a UE. Aspects presented herein provide for model based CSI tracking that may address channel variations while also conserving wireless resources and avoiding additional CSI overhead.

Figure 4:
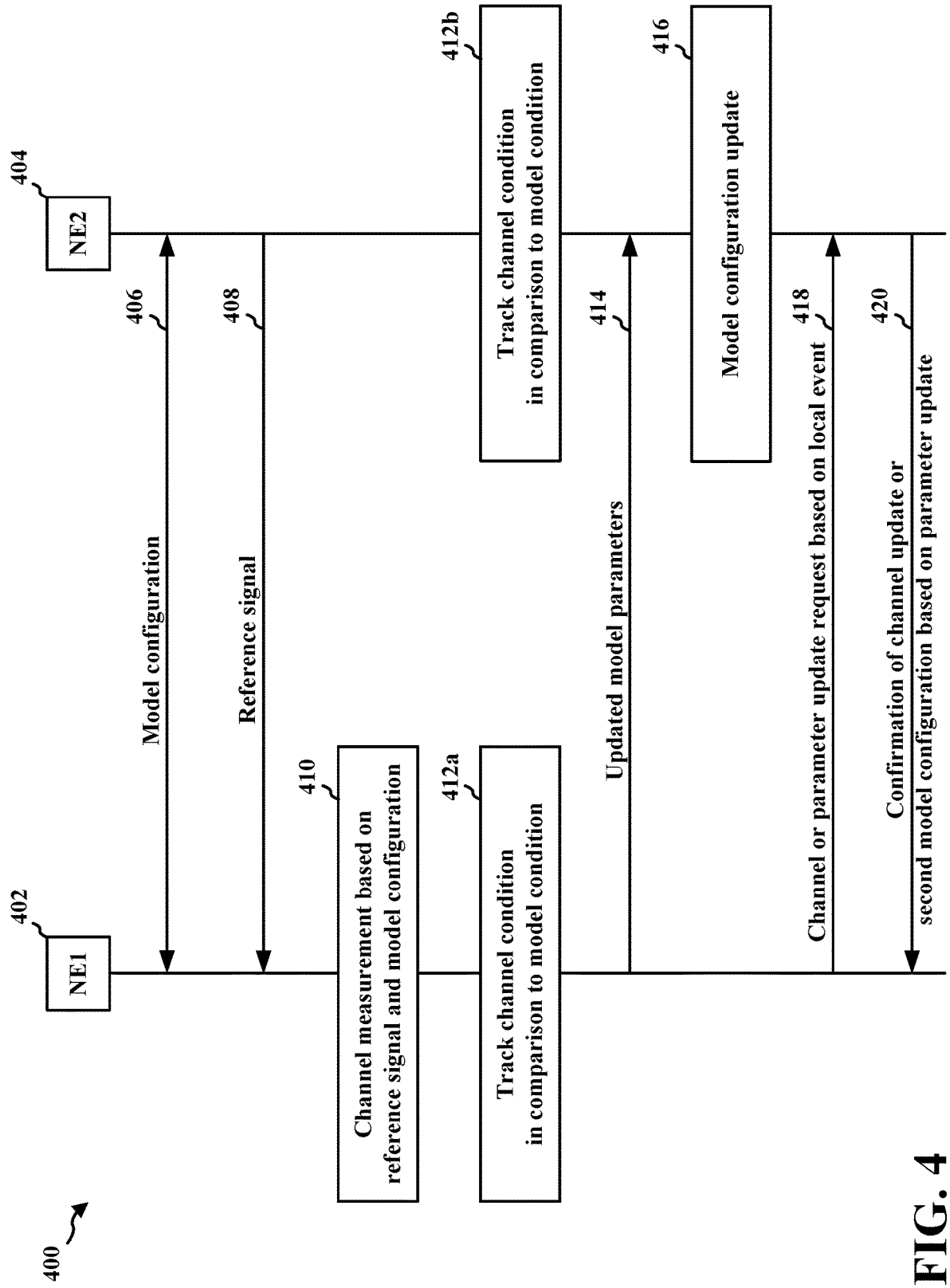
FIG. 4 is a call flow diagram illustrating communications between a first network entity and a second network entity.

FIG. 4 is a call flow diagram 400 illustrating communications between a first network entity 402 and a second network entity 404. In a first example, the first network entity 402 may be a UE and the second network entity 404 may be a base station or an entity at a base station. In a second example, the first network entity 402 may be a base station or an entity at a base station and the second network entity 404 may be a UE. In a third example associated with sidelink communication, the first network entity 402 may be a first UE and the second network entity 404 may be a second UE. In a fourth example associated with mobile IAB nodes, the first network entity 402 may be a first relay/base station and the second network entity 404 may be a second relay/base station.

At 406, the second network entity 404 may transmit a model configuration to the first network entity 402 or receive a model configuration from the first network entity 402. The model configuration may be used by both the first network entity 402 and the second network entity 404 to track a condition of a channel between the first network entity 402 and the second network entity 404 based on one or more initial model parameters. The one or more initial model parameters may be included with the model configuration received/transmitted, at 406, in association with the first network entity 402.

At 408, the second network entity 404 may transmit a reference signal to the first network entity 402 for the first network entity 402 to measure the condition of the channel between the first network entity 402 and the second network entity 404. In cases where the reference signal is transmitted on downlink from a base station to a UE, the reference signal may correspond to periodic CSI-RS, aperiodic CSI-RS, semi-persistent CSI-RS, downlink DM-RS, etc. In cases where the reference signal is transmitted on uplink from the UE to the base station, the reference signal may correspond to SRS, uplink DM-RS, etc. In further examples, the reference signal may correspond to sidelink measurement resources of a first UE and a second UE.

At 410, the first network entity 402 may perform a channel measurement of the channel between the first network entity 402 and the second network entity 404 based on the reference signal received, at 408, and the model configuration received/transmitted, at 406. For example, the first network entity 402 may execute a channel measurement and/or a channel tracking algorithm, which may be based on the model configuration. At 412a, the first network entity 402 may track the channel condition in comparison to a model condition associated with the model configuration for the channel. As an example, a UE may compare the actual channel observed by the UE, based on measurements of the reference signal 408, to the model configuration for the channel. The second network entity 404 may similarly track, at 412b, the condition of the channel in comparison to the model condition associated with the model configuration after transmitting/receiving the model configuration, at 406, and transmitting the reference signal, at 408, to the first network entity 402.

At 414, the first network entity 402 may transmit updated model parameters to the second network entity 404. The updated model parameters may be based on the channel measurement performed, at 410, and the channel tracking performed, at 412a, by the first network entity 402. For example, if the first network entity 402 obtains channel measurements of the reference signal 408 that differ from the model configuration received/transmitted, at 406, the first network entity 402 may provide information about the difference, such as updated model parameters to align more closely with the actual channel measurements, to the second network entity 404. In some aspects, the updated model parameters may be considered a difference, or delta, between the expected channel measurements based on the model configuration and the actual channel measurements of the reference signal 408. For example, if the channel measurements are consistent with the parameters of the model configuration for the channel, the first network entity might skip sending updated model parameters at 414, or may merely send an indication that the measurements are consistent with the model. If the channel measurements indicate a change or difference from the model channel based on the model configuration, the first network entity 402 may send information that allows the network entities to update the model configuration to provide a model that is more aligned with the measured channel. At 416, the second network entity 404 may perform a model configuration update based on the updated model parameters received, at 414, from the first network entity 402.

In some examples, the first network entity 402 may detect a local event at the first network entity 402, such as a mobility change of the first network entity 402, a change in a device condition (e.g., battery life, power usage, device heating, etc.), a change in the condition of the channel between the first network entity 402 and the second network entity 404, etc. At 418, the first network entity 402 may transmit a channel or parameter update request to the second network entity 404 based on the local event. For example, the first network entity 402 may request to use a different channel for communicating with the second network entity 404 or may recommend an update to the model configuration based on the local event. At 420, the second network entity 404 may transmit a confirmation of the channel update to the first network entity 402, or may transmit an updated model configuration to the first network entity 402 based on the requested parameter update.

Figure 5:
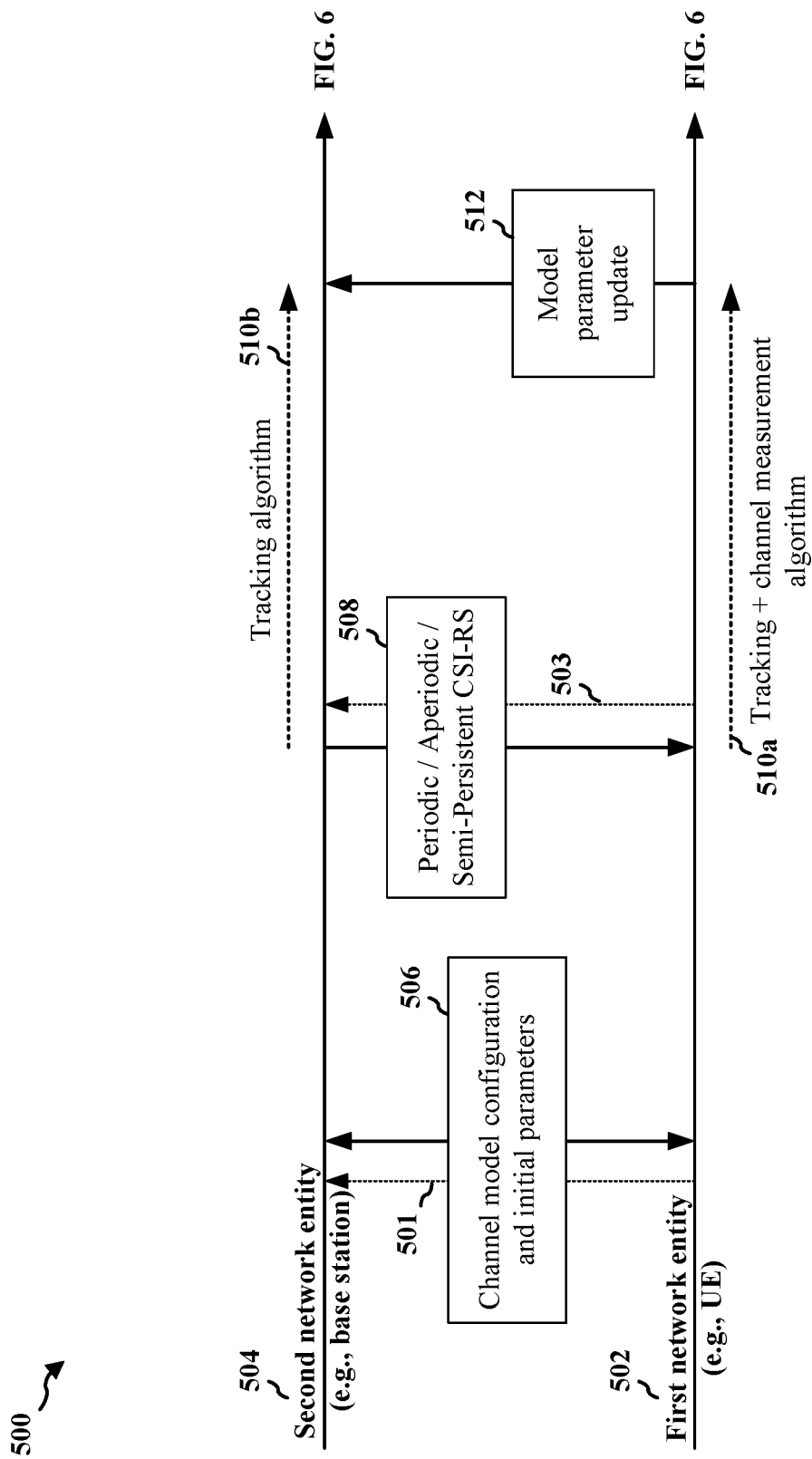
FIG. 5 is a call flow diagram illustrating a model-based channel compression technique.

FIG. 5 is a call flow diagram 500 illustrating a model-based channel compression technique. Reducing an overhead associated with channel state information (CSI) measurement and CSI reporting may increase a performance of a first network entity 502, such as a UE, and/or a second network entity 504, such as a base station or a component of a base station. For example, reducing a number of CSI measurements may increase a system throughput between the first network entity 502 and the second network entity 504. However, reducing the number of CSI measurements may also reduce a quality of the CSI, as more CSI measurements may provide increased measurement accuracy, but may also increase the overhead. A reduction of the overhead may be advantageous for high mobility use cases, such as for UEs moving at speeds of 30-500 kilometers per hour (kmph), applications associated with Industrial IoT (IIoT) procedures, automotive applications, highway applications, high-speed train applications, etc.

Some Type II CSI feedback procedures may experience a performance loss even at moderate speeds of the UE, such as 10-30 kmph. Performance loss may occur based on a channel variation being too fast for a CSI measurement/update rate (i.e., a frequency at which the CSI measurement and CSI reporting is performed by the UE). By a time that the UE performs the CSI measurement and reports the CSI measurement to the scheduling entity (e.g., second network entity 504), the CSI report may become outdated. Thus, subsequent transmissions or pre-coding procedures that are based on the CSI measurement and the CSI report may not be accurate. For example, a mismatch may occur between the indicated CSI measurement and the actual channel conditions through which a signal may be propagated. Type II/enhanced TypeII (eType II) procedures for tracking the CSI feedback may also include increased CSI processing times in comparison to Type-I single panel (SP) CSI feedback procedures.

In an example, the CSI measurement/update rate may be increased at the first network entity 502 based on a channel variation rate. The second network entity 504 may request the first network entity 502 to report the CSI feedback to the second network entity 504 more frequently for tracking an increased variability of the channel. A request for tracking the increased variability of the channel may also be transmitted in the reverse direction from the first network entity 502 to the second network entity 504. Such requests may generate an increased downlink/uplink resource overhead that may decrease the system throughput. More frequent reporting occasions by the first network entity 502 may also increase a battery power consumption at the first network entity 502 (e.g., a UE). Accordingly, the first network entity 502 may have to improve CSI feedback and tracking procedures by decreasing an associated overhead.

A CSI measurement/reporting rate may be adjusted at the first network entity 502 based on a channel coherence time. When the channel variation and the mobility of the first network entity 502 is low, the channel coherence time may be large, which may allow the CSI measurement/reporting update rate to be low. That is, the update rate may be a function of the channel coherence time. A fast varying channel may correspond to an increased CSI measurement/reporting update rate. If the coherence time is too short for highly mobile network entities (e.g., UEs) associated with a fast/frequent CSI measurement/reporting update rate, an adaptive approach based on the channel coherence time may still result in significant signaling configuration/re-configuration overhead, such as when the mobility of the network entity is non-uniform. Multiple configurations and signaling updates may be used to indicate information to the first network entity 502 and receive CSI feedback from the first network entity 502 indicative of the mobility of the first network entity 502 and/or parameters to use for measuring and reporting the CSI feedback.

Doppler domain information associated with the CSI feedback may be used to indicate timing information for frequency domain codebooks and/or spatial domain codebooks. For example, Doppler domain compression may be based on the channel correlation time. For mmW communications and higher bands, such as FR2, FR4, etc., the CSI feedback may be compressed in the Doppler domain in addition to the frequency domain and/or the spatial domain. The CSI feedback may be indicative of precoder entries of a Type II codebook. While the codebook size and the reporting overhead may be increased, such techniques may provide improved channel tracking with less frequent CSI reporting occasions. However, a CSI processing time for each report may be higher than a processing time for Type II and/or eType II CSI reporting procedures.

DM-RS-based CSI feedback adjustments may be performed based on a PMI and/or an RI/CQI. In addition to tracking the channel based on CSI resources, the DM-RS of scheduled downlink transmissions may be used for adjusting a previous CSI feedback report from the first network entity 502. Additional signaling may be performed with the downlink traffic to associate DM-RS resources with previous CSI resources/reports. The channel may be modeled as a time-varying, multi-path complex channel based on a linear combination of narrowband, time-invariant components, with CSI feedback via the PMI, RI, layer indicator (LI), CQI, etc.

While the channel may be modeled in some cases as a time-varying wideband channel, a model-based representation of the channel may also be configured to track the channel variation with reduced overhead. As described in connection with FIG. 4, the model may be updated periodically at the Tx node (e.g., second network entity 504) and the Rx node (e.g., first network entity 502), such that a same model may be used to predict a future CSI without performing a corresponding measurement. For instance, the model may be based on a state-space channel profile where each state may correspond to a sparse representation of the channel in a multi-dimensional space. Procedures associated with the model-based representation of the channel may be similar to a delta CSI update for tracking the channel for CSI feedback, but may be further compressed based on the model configuration communicated, at 506, between the second network entity 504 and the first network entity 502.

The first network entity 502 and the second network entity 504, such as a UE and a base station, may exchange common model information during an initial setup procedure for tracking the channel. For example, at 506, the second network entity 504 (e.g., base station) may transmit/receive a channel model configuration and initial parameters to/from the first network entity 502 (e.g., UE). The channel model configuration may be used by the first network entity 502 and the second network entity 504 to ensure that both nodes are using a same model to predict the CSI.

The first network entity 502 may measure the channel based on a reference signal received from the second network entity 504. The reference signal and corresponding measurement may occur before or after the channel model configuration and initial parameters are communicated, at 506, between the second network entity 504 and the first network entity 502. The reference signal may correspond to periodic CSI-RS, aperiodic CSI-RS, or semi-persistent CSI-RS. In an example, the first network entity 502 may receive, at 508, the periodic/aperiodic/semi-persistent CSI-RS for measuring the channel after reception/transmission, at 506, of the channel model configuration and initial parameters.

Based on receiving the periodic/aperiodic/semi-persistent CSI-RS from the second network entity 504, the first network entity 502 may execute, at 510a, a channel tracking and channel measurement algorithm. The second network entity 504 may likewise execute, at 510b, a channel tracking algorithm after transmission, at 508, of the periodic/aperiodic/semi-persistent CSI-RS to the first network entity 502. Based on a channel measurement by the first network entity 502 indicative of a change in a condition of the channel, the first network entity 502 may transmit, at 512, a model parameter update to the second network entity 504 via a CSI feedback procedure. For example, a state-space model including complex and/or vector weights, a measured noise variance, etc., may be signaled, at 512, from the first network entity 502 to the second network entity 504. Each of the nodes (e.g., UE and base station) may be configured to further track the state-space variation. In some implementations, the nodes may determine a mapping between the physical channel and a state vector, and/or a relation between PMI/RI/LI/CQI and the state vector. The mapping/relationship may be incorporated in an exchange of common model information between the nodes.

Each of the nodes may be configured to update/track the channel variation/state-space variation based on one or more filtering operations for the state-space model. For example, one of the nodes may execute an adaptive CSI update algorithm, such as a Kalman filtering algorithm, to track the channel variation, where the update may be transmitted to the other node based on a measurement performed by a measuring node. A CSI report of model parameters (e.g., at 512) may include a Kalman gain update, an indication of non-measuring node updates for the model/channel information, etc. The update, at 512, may be performed by a measuring entity (e.g., the first network entity 502) using a compressed CSI report in which the report may include the model parameter updates for the non-measuring entity (e.g., second network entity 504) to update the model information.

When a state change occurs (e.g., due to a mobility change), the first network entity 502 (e.g., UE) may sparsely update the model parameter to reduce signaling/resource overhead while also ensuring reliable and efficient tracking of the channel variation. In examples, the first network entity 502 may reset a tracking session to ensure that both network entities are tracking the channel variation based on a same state-space model. When an update occurs, at 512, based on a measurement by the first network entity 502 or when a change to the physical channel is detected, a compressed CSI report may be transmitted, at 512, to the second network entity 504 or the tracking session may be reset at the first network entity 502. Such techniques may reduce the signaling overhead and increase the throughput of the system. Accordingly, a model-based representation of the channel may provide both an overhead reduction and more efficient tracking of the channel via a decreased amount of CSI feedback and measurements by the first network entity 502.

Model-based channel compression techniques may be based on the first network entity 502 performing a channel measurement and transmitting, at 512, the compressed CSI feedback report to the second network entity 504. However, model-based channel compression may also be performed for uplink and/or sidelink communications. For instance, the first network entity 502 may indicate the channel model configuration and initial parameters in the reverse direction to the second network entity 504, which may track the channel based on the state-space model for the channel model configuration associated with the communication link between the first network entity 502 and the second network entity 504. Channel measurements by the second network entity 504 may be based on an uplink reference signal, such as SRS, such that the second network entity 504 may transmit model parameter updates in the reverse direction to the first network entity 502.

After an initial setup procedure between the first network entity 502 and the second network entity 504, a reference signal for channel measurement, such as the periodic/aperiodic/semi-persistent CSI-RS or SRS, may be communicated between the nodes. Feedback may be transmitted from the measuring node to the non-measuring node, such that both nodes may determine an initial state of the system. One node may transmit the feedback to the other node in some cases before receiving the model configuration from the other node. For example, CSI feedback may correspond to legacy transmissions of CSI-RS and CSI feedback, which may be used by the second network entity 504 to configure the model and the initial parameters transmitted to the first network entity 502.

Both nodes may track the channel variation based on the state-space model. If the first network entity 502 is the node that is performing the channel measurement, the first network entity 502 may provide the update, at 512, in addition to the channel tracking, at 510*a*, to recommend a state-space change to the second network entity 504. That is, the measuring node may perform both the tracking procedure and the channel measurement for updating, at 512, the model parameters.

The first network entity 502 may indicate a delta change to the second network entity 504 via compressed CSI feedback, which may be used for updating the state-space model at the second network entity 504. Channel tracking procedures may be respectively executed at both nodes, at 510*a*-510*b*, but when a measurement and update occurs at one of the nodes, the measurement and update may be indicated to the other node via a feedback procedure. Frequent CSI transmissions and reporting, signaling overhead, and power consumption may be reduced via model-based channel compression techniques. Likewise, uplink reference signals may be used to perform the procedure in the reverse direction where the second network entity 504 may update the model/states and signal the updated model/states to the first network entity 502.

In some aspects, as shown at 501 and/or 503, the first network entity 502 may provide initial feedback, such as initial CSI, for the channel. For example, before the channel model configuration and initial parameters are communicated, at 506, the first network entity 502 may send feedback 501, which the second network entity 504 may use to determine the channel model configuration and/or initial parameters to send to the first network entity. Additionally, or alternatively, the first network entity 502 may send initial feedback 503 that assists the first network entity 502 and/or the second network entity 504 in tracking the channel at 510*a* or 510*b*.

Figure 6:
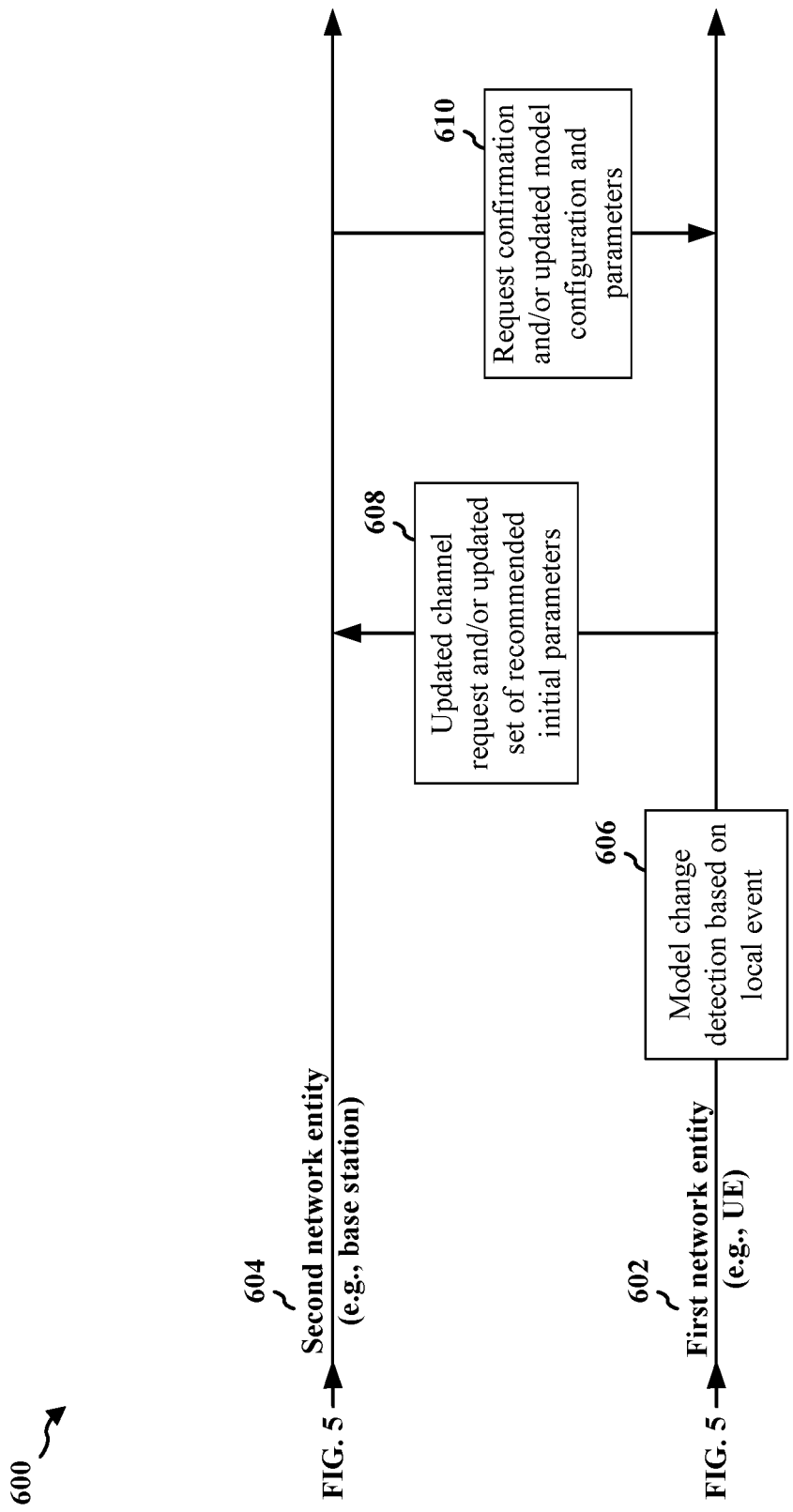
FIG. 6 is a call flow diagram illustrating a model-based channel compression technique.

FIG. 6 is a call flow diagram 600 illustrating a model-based channel compression technique. At 606, a first network entity 602 (e.g., UE) may detect a model change based on a local event at the first network entity 602. The local event may include a mobility change of the first network entity 602, a change in channel conditions (e.g., noise, interference, blockage), or a change of the physical device (e.g., battery life, power usage, device heating, etc.).

After the first network entity 602 detects, at 606, a change to the model/states, the first network entity 602 may trigger, at a second network entity 604 (e.g., base station), a switch of the channel or an update to the model. For example, the first network entity 602 may transmit, at 608, a request for an updated channel and/or an updated set of recommended initial parameters. In cases where the first network entity 602 performs the measurement, the first network entity 602 may switch a Tx/Rx configuration based on detected changes to the mobility of the first network entity 602, channel conditions, device conditions, etc. The switch of the Tx/Rx configuration may impact parameters of the channel model configuration.

If the first network entity 602 detects, at 606, a model change based on a local event at the first network entity 602, the first network entity 602 may indicate to the second network entity 604 that the nodes may no longer use a current channel model configuration. For example, the first network entity 602 may transmit (e.g., in a PUSCH) the request, at 608, for the updated channel and/or the updated set of recommended initial parameters. Based on a report from the first network entity 602, the second network entity 604 may respond/transmit, at 610, to the first network entity 602 with a confirmation message to the request and/or an updated channel model configuration and parameters.

Since both nodes may be tracking the channel based on a common model, whenever a change is detected by one of the nodes, the detecting node may indicate the change to the other node (e.g., non-detection node). In some examples, a different beam pair may be used for communications between the first network entity 602 and the second network entity 604. If a different beam is used by one of the nodes to perform the communication, the different beam may have different properties based on the channel parameters. For instance, the different beam may have a different delay spread, Doppler spread, etc. The parameters may be beam-specific. Hence, if a different tracking procedure is to be performed for the different beam or the different CSI-RS resource, or if the number of ports or the rank associated with the transmission has changed, a new tracking session may have to be initiated.

An example state-space channel model may correspond to $h(n)=Fh(n-1)+w(n)$, and an example observation model may correspond to $z(n)=h(n)+v(n)$, where $h(n)$ corresponds to the channel at time n, F corresponds to a state transition matrix, $w(n)$ corresponds to process noise approximated by $CN(0, Q)$, where CN is indicative of a complex normal distribution, and $v(n)$ corresponds to a measurement noise approximated by $CN(0, R)$. F, Q, and R may correspond to portions of the model configuration that are commonly agreed upon between the nodes.

The state-space model may be indicative of the channel to be measured, whereas the state transition matrix may represent part of the model configuration between the first network entity 602 and the second network entity 604. At each observation instance, the nodes may apply the transition matrix to a previous observation to determine a current state. At least one of the nodes may measure the channel, which may include the state. The measurement process may be noisy in some cases. Thus, covariance in the system may be associated with unknown variables.

In some examples, rather than reporting a differential channel state (e.g., based on $\Delta h(n)=h(n)-h(n-1)$), a model-based update (e.g., based on $K_n y(n)$, where $K_n$ corresponds to a Kalman gain/filter coefficient at time n, and $y(n)$ corresponds to a procedure at time n based on the observation model and the state-space model) may be reported from the first network entity 602 to the second network entity 604. The same state-space model and Kalman filtering procedure may be used at both nodes to predict a future channel corresponding to $\hat{h}(n+k|n)$. Instead of applying the state-space model to determine the channel $h(n)$, similar state-space models may also be applied to other channel state feedback (CSF) metrics, such as CQI, PMI, etc., to determine channel information.

Figure 7:
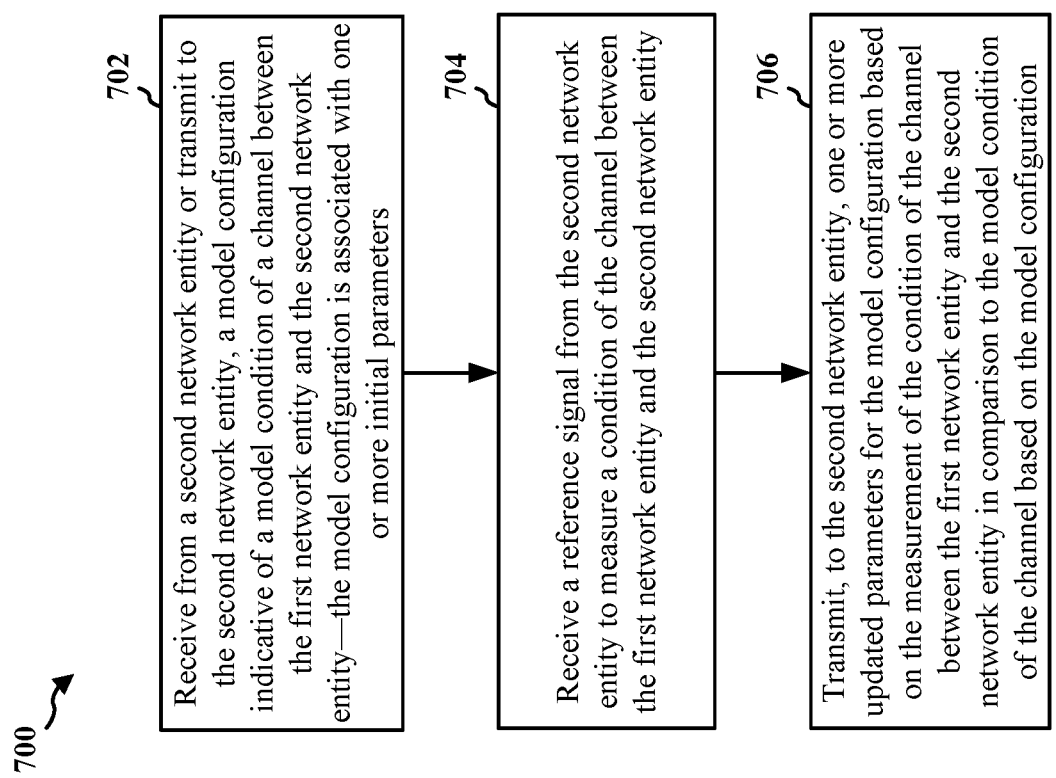
FIG. 7 is a flowchart of a method of wireless communication at a first network entity.

FIG. 7 is a flowchart 700 of a method of wireless communication. The method may be performed by a first network entity (e.g., the UE 104, 350, the first network entity 402, 502, 602, the apparatus 1104, etc.), which may include the memory 360 and which may correspond to the entire UE 104, 350, first network entity 402, 502, 602, or apparatus 1104, or a component of the UE 104, 350, first network entity 402, 502, 602, or apparatus 1104, such as the TX processor 368, the RX processor 356, the controller/processor 359, the cellular baseband processor 1124, and/or the application processor 1106. The method may be performed to improve channel tracking procedures based on reduced overhead.

At 702, the first network entity may receive from a second network entity or transmit to the second network entity, a model configuration indicative of a model condition of a channel between the first network entity and the second network entity—the model configuration is associated with one or more initial parameters. For example, referring to FIGS. 4-5, the first network entity 402 may receive/transmit, at 406, a model configuration from/to the second network entity 404. At 506, the first network entity 502 may receive/transmit a channel model configuration and initial parameters from/to the second network entity 504. The reception/transmission, at 702, may be performed by the channel model update component 198 of the apparatus 1104 in FIG. 11.

At 704, the first network entity may receive a reference signal from the second network entity to measure a condition of the channel between the first network entity and the second network entity. For example, referring to FIGS. 4-5, the first network entity 402 may receive, at 408, a reference signal from the second network entity 404 for performing the channel measurement, at 410. At 508, the first network entity 502 may receive periodic, aperiodic, or semi-persistent CSI-RS from the second network entity 504 for executing, at 510a, a channel measurement algorithm. The reception, at 704, may be performed by the channel model update component 198 of the apparatus 1104 in FIG. 11.

At 706, the first network entity may transmit, to the second network entity, one or more updated parameters for the model configuration based on the measurement of the condition of the channel between the first network entity and the second network entity in comparison to the model condition of the channel based on the model configuration. For example, referring to FIGS. 4-5, the first network entity 402 may transmit, at 414, updated model parameters to the second network entity 404 based on the channel measurement performed, at 410, and the tracking performed, at 412a, of the channel condition. At 512, the first network entity 502 may transmit a model parameter update to the second network entity 504 based on execution, at 510a, of the channel tracking and channel measurement algorithm. The transmission, at 706, may be performed by the channel model update component 198 of the apparatus 1104 in FIG. 11.

Figure 8:
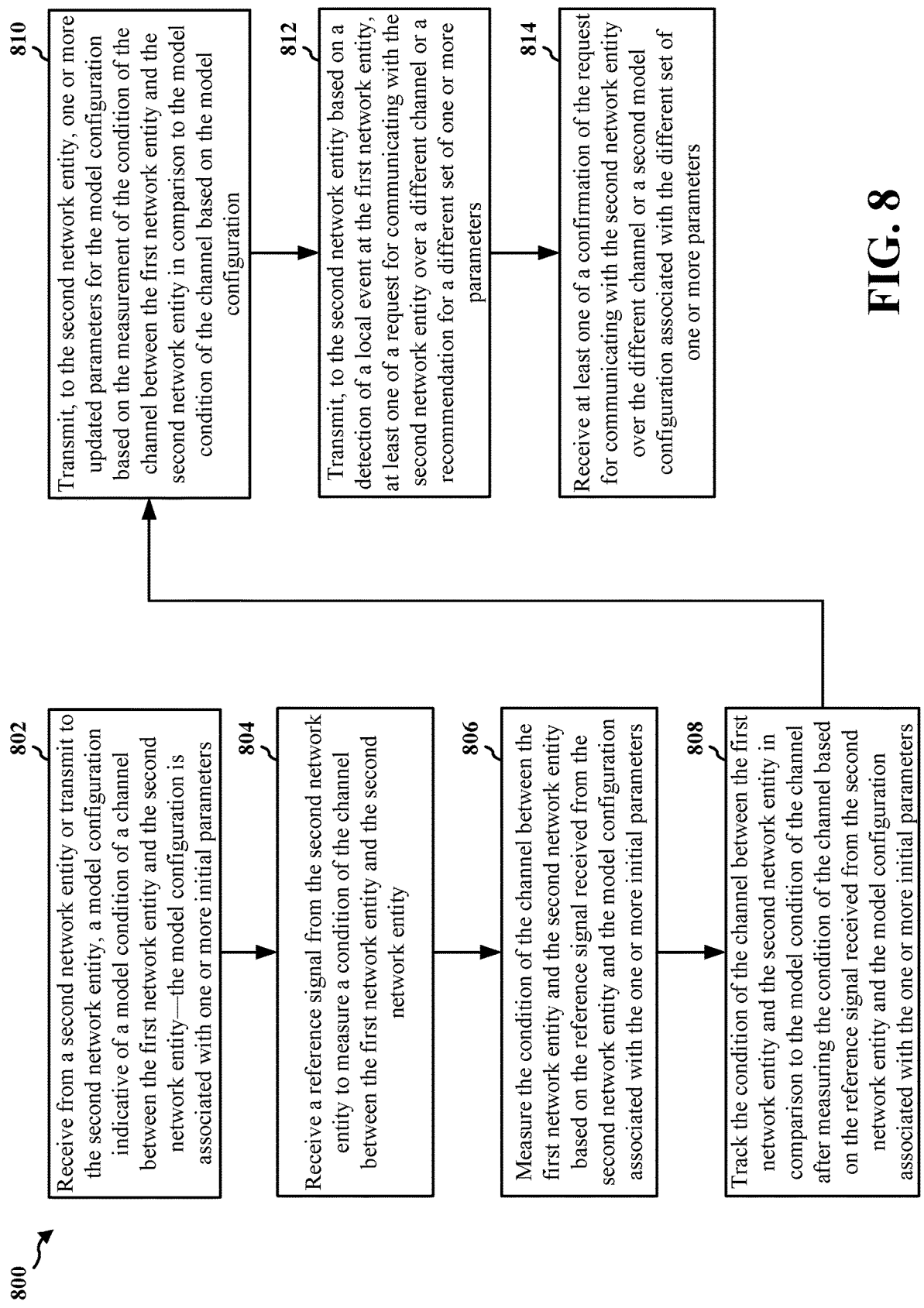
FIG. 8 is a flowchart of a method of wireless communication at a first network entity.

FIG. 8 is a flowchart 800 of a method of wireless communication. The method may be performed by a first network entity (e.g., the UE 104, 350, the first network entity 402, 502, 602, the apparatus 1104, etc.), which may include the memory 360 and which may correspond to the entire UE 104, 350, first network entity 402, 502, 602, or apparatus 1104, or a component of the UE 104, 350, first network entity 402, 502, 602, or apparatus 1104, such as the TX processor 368, the RX processor 356, the controller/processor 359, the cellular baseband processor 1124, and/or the application processor 1106. The method may be performed to improve channel tracking procedures based on reduced overhead.

At 802, the first network entity may receive from a second network entity or transmit to the second network entity, a model configuration indicative of a model condition of a channel between the first network entity and the second network entity—the model configuration is associated with one or more initial parameters. For example, referring to FIGS. 4-5, the first network entity 402 may receive/transmit, at 406, a model configuration from/to the second network entity 404. At 506, the first network entity 502 may receive/transmit a channel model configuration and initial parameters from/to the second network entity 504. The reception/transmission, at 802, may be performed by the channel model update component 198 of the apparatus 1104 in FIG. 11.

At 804, the first network entity may receive a reference signal from the second network entity to measure a condition of the channel between the first network entity and the second network entity. For example, referring to FIGS. 4-5, the first network entity 402 may receive, at 408, a reference signal from the second network entity 404 for performing the channel measurement, at 410. At 508, the first network entity 502 may receive periodic, aperiodic, or semi-persistent CSI-RS from the second network entity 504 for executing, at 510a, a channel measurement algorithm. The reception, at 804, may be performed by the channel model update component 198 of the apparatus 1104 in FIG. 11.

At 806, the first network entity may measure the condition of the channel between the first network entity and the second network entity based on the reference signal received from the second network entity and the model configuration associated with the one or more initial parameters. For example, referring to FIG. 4, the first network entity 402 may perform, at 410, a channel measurement based on the reference signal received, at 408, and the model configuration received, at 406, from the second network entity 404. The measurement, at 806, may be performed by the channel model update component 198 of the apparatus 1104 in FIG. 11.

At 808, the first network entity may track the condition of the channel between the first network entity and the second network entity in comparison to the model condition of the channel after measuring the condition of the channel based on the reference signal received from the second network entity and the model configuration associated with the one or more initial parameters. For example, referring to FIGS. 4-5, the first network entity 402 may track, at 412a, a channel condition in comparison to a model condition. At 510a, the first network entity may execute a channel tracking algorithm. The tracking, at 808, may be performed by the channel model update component 198 of the apparatus 1104 in FIG. 11.

At 810, the first network entity may transmit, to the second network entity, one or more updated parameters for the model configuration based on the measurement of the condition of the channel between the first network entity and the second network entity in comparison to the model condition of the channel based on the model configuration. For example, referring to FIGS. 4-5, the first network entity 402 may transmit, at 414, updated model parameters to the second network entity 404 based on the channel measurement performed, at 410, and the tracking performed, at 412a, of the channel condition. At 512, the first network entity 502 may transmit a model parameter update to the second network entity 504 based on execution, at 510a, of the channel tracking and channel measurement algorithm. The transmission, at 810, may be performed by the channel model update component 198 of the apparatus 1104 in FIG. 11.

At 812, the first network entity may transmit, to the second network entity based on a detection of a local event at the first network entity, at least one of a request for communicating with the second network entity over a different channel or a recommendation for a different set of one or more parameters. For example, referring to FIGS. 4 and 6, the first network entity 402 may transmit, at 418, a channel or parameter update request to the second network entity 404 based on a local event at the first network entity 402. At 608, the first network entity 602 may transmit an updated channel request and/or an updated set of recommended initial parameters to the second network entity 604 based on a model change detection, at 606, associated with a local event at the first network entity 602. The transmission, at 812, may be performed by the channel model update component 198 of the apparatus 1104 in FIG. 11.

At 814, the first network entity may receive at least one of a confirmation of the request for communicating with the second network entity over the different channel or a second model configuration associated with the different set of one or more parameters. For example, referring to FIGS. 4 and 6, the first network entity 402 may receive, at 420, a confirmation of the channel update or a second model configuration based on the parameter update. At 610, the first network entity 602 may receive a confirmation and/or an updated model configuration and parameters from the second network entity 604. The reception, at 814, may be performed by the channel model update component 198 of the apparatus 1104 in FIG. 11.

Figure 9:
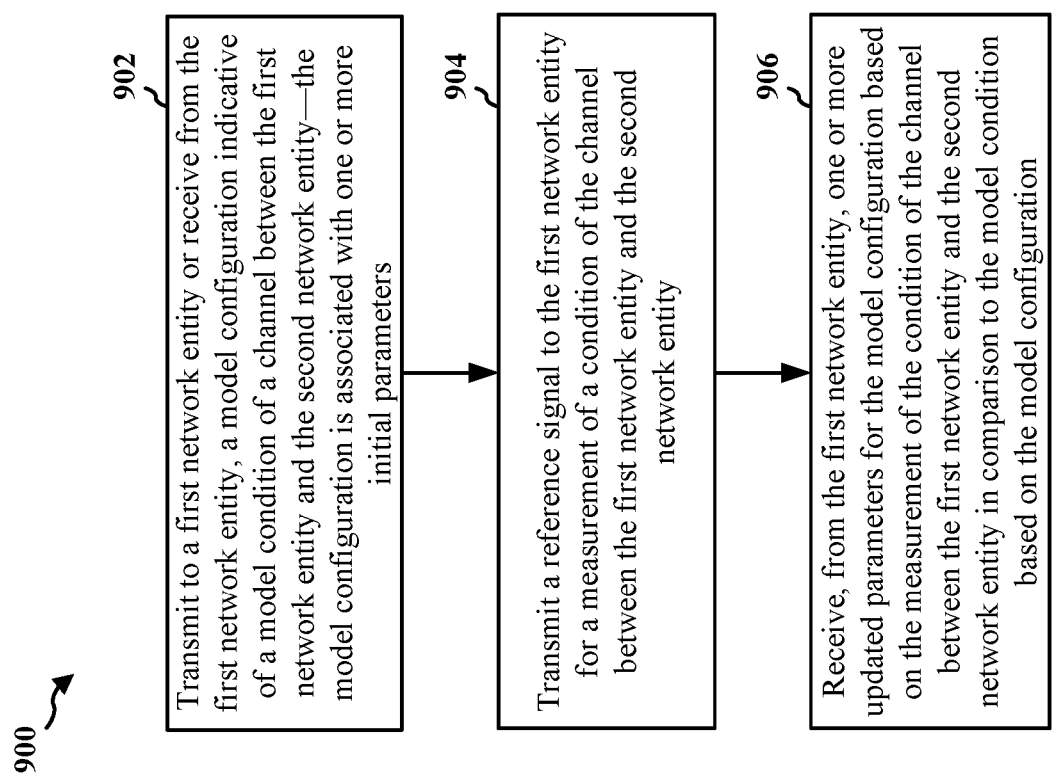
FIG. 9 is a flowchart of a method of wireless communication at a second network entity.

FIG. 9 is a flowchart 900 of a method of wireless communication. The method may be performed by a second network entity (e.g., the second network entity 404, 504, 604, the network entity 1102, the base station 102, 310, the CU 110, the DU 130, the RU 140, etc.), which may include the memory 376 and which may correspond to the entire second network entity 404, 504, 604, 1102 or base station 102, 310, or a component of the second network entity 404, 504, 604, 1102 or the base station 102, 310, such as the CU 110, the DU 130, the RU 140, the TX processor 316, the RX processor 370, and/or the controller/processor 375. The method may be performed to improve channel tracking procedures based on reduced overhead.

At 902, the second network entity may transmit to a first network entity or receive from the first network entity, a model configuration indicative of a model condition of a channel between the first network entity and the second network entity—the model configuration is associated with one or more initial parameters. For example, referring to FIGS. 4-5, the second network entity 404 may transmit/receive, at 406, a model configuration to/from the first network entity 402. At 506, the second network entity 504 may transmit/receive a channel model configuration and initial parameters to/from the first network entity 502. The transmission/reception, at 902, may be performed by the channel model configuration component 199 of the network entity 1102 in FIG. 11.

At 904, the second network entity may transmit a reference signal to the first network entity for a measurement of a condition of the channel between the first network entity and the second network entity. For example, referring to FIGS. 4-5, the second network entity 404 may transmit, at 408, a reference signal to the first network entity 402 for performing the channel measurement, at 410. At 508, the second network entity 504 may transmit periodic, aperiodic, or semi-persistent CSI-RS to the first network entity 502 for executing, at 510a, a channel measurement algorithm. The transmission, at 904, may be performed by the channel model configuration component 199 of the network entity 1102 in FIG. 11.

At 906, the second network entity may receive, from the first network entity, one or more updated parameters for the model configuration based on the measurement of the condition of the channel between the first network entity and the second network entity in comparison to the model condition based on the model configuration. For example, referring to FIGS. 4-5, the second network entity 404 may receive, at 414, updated model parameters from the first network entity 402 based on the channel measurement performed, at 410, and the tracking performed, at 412a, of the channel condition. At 512, the second network entity 504 may receive a model parameter update from the first network entity 502 based on execution, at 510a, of the channel tracking and channel measurement algorithm. The reception, at 906, may be performed by the channel model configuration component 199 of the network entity 1102 in FIG. 11.

Figure 10:
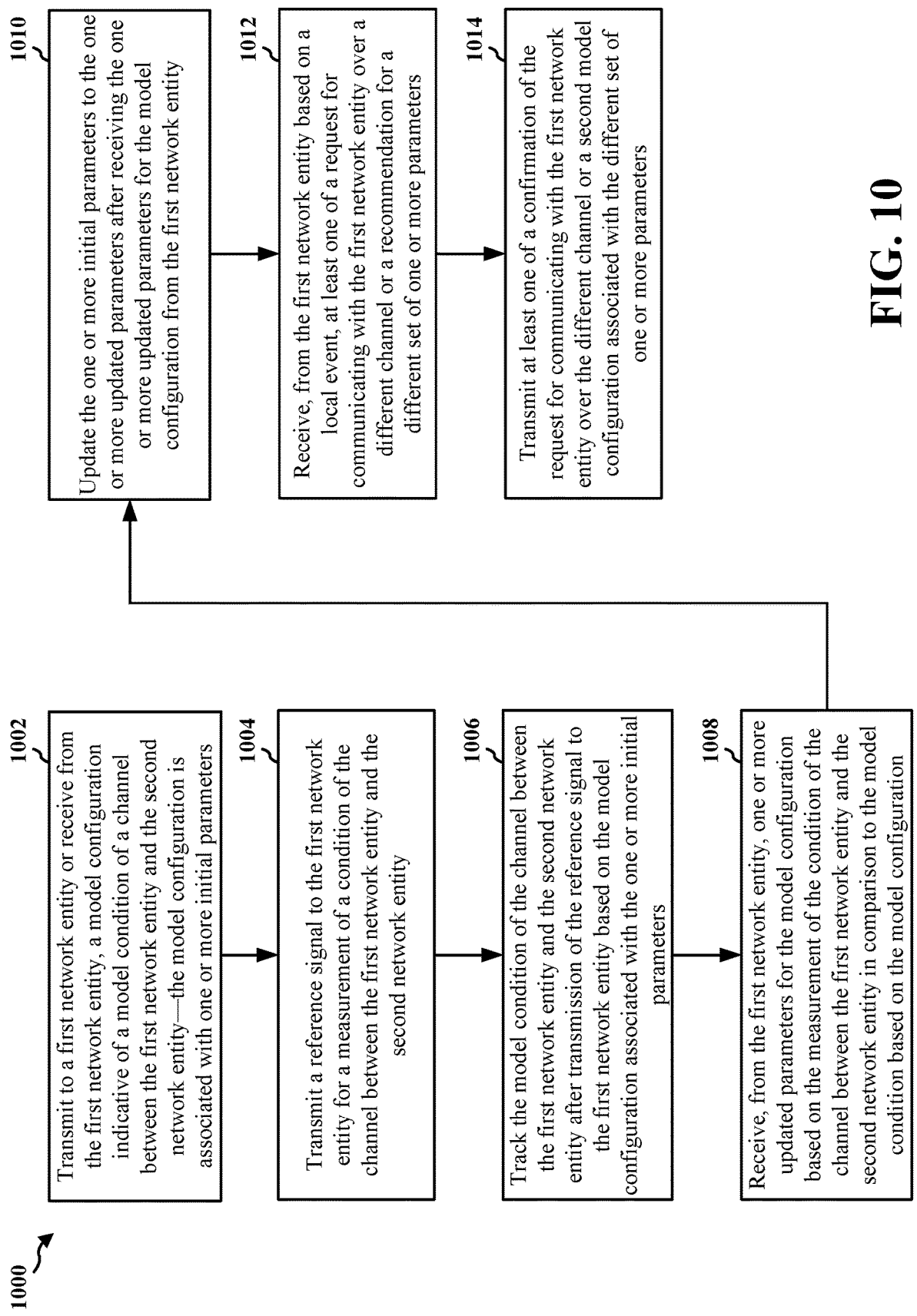
FIG. 10 is a flowchart of a method of wireless communication at a second network entity.

FIG. 10 is a flowchart 1000 of a method of wireless communication. The method may be performed by a second network entity (e.g., the second network entity 404, 504, 604, the network entity 1102, the base station 102, 310, the CU 110, the DU 130, the RU 140, etc.), which may include the memory 376 and which may correspond to the entire second network entity 404, 504, 604, 1102 or base station 102, 310, or a component of the second network entity 404, 504, 604, 1102 or the base station 102, 310, such as the CU 110, the DU 130, the RU 140, the TX processor 316, the RX processor 370, and/or the controller/processor 375. The method may be performed to improve channel tracking procedures based on reduced overhead.

At 1002, the second network entity may transmit to a first network entity or receive from the first network entity, a model configuration indicative of a model condition of a channel between the first network entity and the second network entity—the model configuration is associated with one or more initial parameters. For example, referring to FIGS. 4-5, the second network entity 404 may transmit/receive, at 406, a model configuration to/from the first network entity 402. At 506, the second network entity 504 may transmit/receive a channel model configuration and initial parameters to/from the first network entity 502. The transmission/reception, at 1002, may be performed by the channel model configuration component 199 of the network entity 1102 in FIG. 11.

At 1004, the second network entity may transmit a reference signal to the first network entity for a measurement of a condition of the channel between the first network entity and the second network entity. For example, referring to FIGS. 4-5, the second network entity 404 may transmit, at 408, a reference signal to the first network entity 402 for performing the channel measurement, at 410. At 508, the second network entity 504 may transmit periodic, aperiodic, or semi-persistent CSI-RS to the first network entity 502 for executing, at 510a, a channel measurement algorithm. The transmission, at 1004, may be performed by the channel model configuration component 199 of the network entity 1102 in FIG. 11.

At 1006, the second network entity may track the model condition of the channel between the first network entity and the second network entity after transmission of the reference signal to the first network entity based on the model configuration associated with the one or more initial parameters. For example, referring to FIGS. 4 and 5, the second network entity 404 may track, at 412b, a channel condition in comparison to a model condition after transmission, at 408, of the reference signal and transmission, at 406, of the model configuration to the first network entity 402. At 510b, the second network entity 504 may execute a tracking algorithm after transmission, at 508, of a periodic, aperiodic, or semi-persistent CSI-RS to the first network entity 502. The tracking, at 1006, may be performed by the channel model configuration component 199 of the network entity 1102 in FIG. 11.

At 1008, the second network entity may receive, from the first network entity, one or more updated parameters for the model configuration based on the measurement of the condition of the channel between the first network entity and the second network entity in comparison to the model condition based on the model configuration. For example, referring to FIGS. 4-5, the second network entity 404 may receive, at 414, updated model parameters from the first network entity 402 based on the channel measurement performed, at 410, and the tracking performed, at 412a, of the channel condition. At 512, the second network entity 504 may receive a model parameter update from the first network entity 502 based on execution, at 510a, of the channel tracking and channel measurement algorithm. The reception, at 1008, may be performed by the channel model configuration component 199 of the network entity 1102 in FIG. 11.

At 1010, the second network entity may update the one or more initial parameters to the one or more updated parameters after receiving the one or more updated parameters for the model configuration from the first network entity. For example, referring to FIG. 4, the second network entity 404 may perform, at 416, a model configuration update after receiving, at 414, the updated model parameters from the first network entity 402. The updating, at 1010, may be performed by the channel model configuration component 199 of the network entity 1102 in FIG. 11.

At 1012, the second network entity may receive, from the first network entity based on a local event, at least one of a request for communicating with the first network entity over a different channel or a recommendation for a different set of one or more parameters. For example, referring to FIGS. 4 and 6, the second network entity 404 may receive, at 418, a channel or parameter update request from the first network entity 402 based on a local event at the first network entity 402. At 608, the second network entity 604 may receive an updated channel request and/or an updated set of recommended initial parameters from the first network entity 602 based on a model change detection, at 606, associated with a local event at the first network entity 602. The reception, at 1012, may be performed by the channel model configuration component 199 of the network entity 1102 in FIG. 11.

At 1014, the second network entity may transmit at least one of a confirmation of the request for communicating with the first network entity over the different channel or a second model configuration associated with the different set of one or more parameters. For example, referring to FIGS. 4 and 6, the second network entity 404 may transmit, at 420, a confirmation of the channel update or a second model configuration based on the parameter update. At 610, the second network entity 604 may transmit a confirmation and/or an updated model configuration and parameters to the first network entity 602. The transmission, at 1014, may be performed by the channel model configuration component 199 of the network entity 1102 in FIG. 11.

Figure 11:
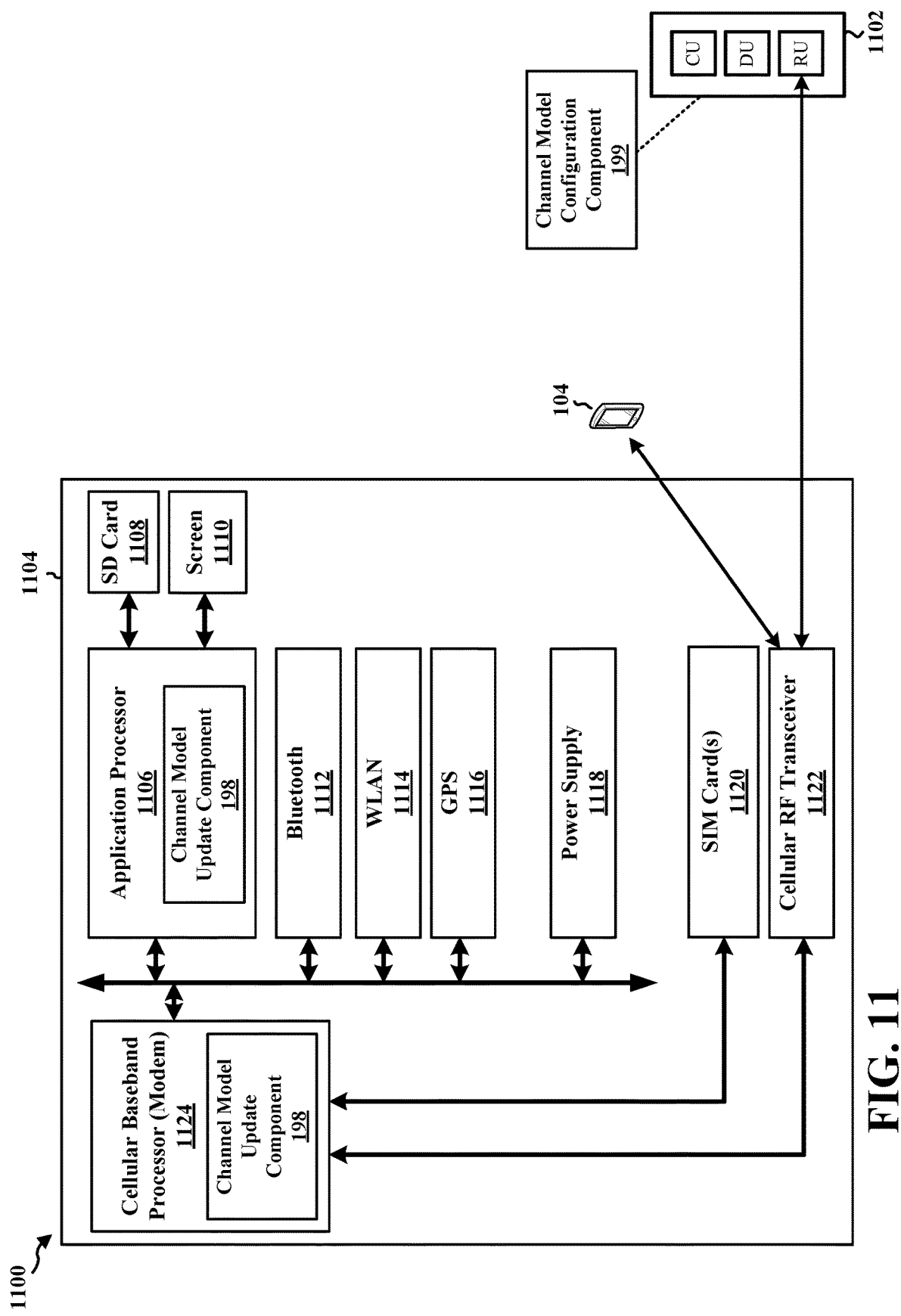
FIG. 11 is a diagram illustrating an example of a hardware implementation for an example apparatus and/or network entity.

FIG. 11 is a diagram 1100 illustrating an example of a hardware implementation for an apparatus 1104 and a network entity 1102. The apparatus 1104 may be a UE, a component of a UE, or may implement UE functionality. The network entity 1102 may be a BS, a component of a BS, or may implement BS functionality. In some aspects, the apparatus 1104 may include a cellular baseband processor 1124 (also referred to as a modem) coupled to a cellular RF transceiver 1122. In some aspects, the apparatus 1104 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1124 communicates through the cellular RF transceiver 1122 with the UE 104 and/or with an RU associated with the network entity 1102. The RU is either part of the network entity 1102 or is in communication with the network entity 1102. The network entity 1102 may include one or more of the CU, DU, and the RU. The cellular baseband processor 1124 and the application processor 1106 may each include a computer-readable medium/memory. Each computer-readable medium/memory may be non-transitory. The cellular baseband processor 1124 and the application processor 1106 are each responsible for general processing, including the execution of software stored on the computer-readable medium/memory. The software, when executed by the cellular baseband processor 1124/application processor

1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed supra, the component 198 is configured to receive from a second network entity or transmit to the second network entity, a model configuration indicative of a model condition of a channel between the first network entity and the second network entity, the model configuration associated with one or more initial parameters; receive a reference signal from the second network entity to measure a condition of the channel between the first network entity and the second network entity; and transmit, to the second network entity, one or more updated parameters for the model configuration based on the measurement of the condition of the channel between the first network entity and the second network entity in comparison to the model condition of the channel based on the model configuration. The component 198 may be within the cellular baseband processor 1124, the application processor 1106, or both the cellular baseband processor 1124 and the application processor 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof.

As shown, the apparatus 1104 may include a variety of components configured for various functions. In one configuration, the apparatus 1104, and in particular the cellular baseband processor 1124 and/or the application processor 1106, includes means for receiving from a second network entity or means for transmitting to the second network entity, a model configuration indicative of a model condition of a channel between the first network entity and the second network entity, the model configuration associated with one or more initial parameters; means for receiving a reference signal from the second network entity to measure a condition of the channel between the first network entity and the second network entity; and means for transmitting, to the second network entity, one or more updated parameters for the model configuration based on the measurement of the condition of the channel between the first network entity and the second network entity in comparison to the model condition of the channel based on the model configuration. The apparatus 1104 further includes means for measuring the condition of the channel between the first network entity and the second network entity based on the reference signal received from the second network entity and the model configuration associated with the one or more initial parameters. The apparatus 1104 further includes means for tracking the condition of the channel between the first network entity and the second network entity in comparison to the model condition of the channel after measuring the condition of the channel based on the reference signal received from the second network entity and the model configuration associated with the one or more initial parameters. The apparatus 1104 further includes means for transmitting, to the second network entity based on a detection of a local event at the first network entity, at least one of a request for communicating with the second network entity over a different channel or a recommendation for a different set of one or more parameters. The apparatus 1104 further includes means for receiving at least one of a confirmation of the request for communicating with the second network entity over the different channel or a second model configuration associated with the different set of one or more parameters.

The means may be the component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

As discussed supra, the component 199 is configured to transmit to a first network entity or receive from the first network entity, a model configuration indicative of a model condition of a channel between the first network entity and the second network entity, the model configuration associated with one or more initial parameters; transmit a reference signal to the first network entity for a measurement of a condition of the channel between the first network entity and the second network entity; and receive, from the first network entity, one or more updated parameters for the model configuration based on the measurement of the condition of the channel between the first network entity and the second network entity in comparison to the model condition based on the model configuration. The component 199 may be within one or more processors (e.g., BBU(s)) of one or more of the CU, DU, and the RU. The component 199 may be one or more hardware components specifically configured to carry out the stated processes/algorithm, implemented by one or more processors configured to perform the stated processes/algorithm, stored within a computer-readable medium for implementation by one or more processors, or some combination thereof.

The network entity 1102 may include a variety of components configured for various functions. In one configuration, the network entity 1102 includes means for transmitting to a first network entity or means for receiving from the first network entity, a model configuration indicative of a model condition of a channel between the first network entity and the second network entity, the model configuration associated with one or more initial parameters; means for transmitting a reference signal to the first network entity for a measurement of a condition of the channel between the first network entity and the second network entity; and means for receiving, from the first network entity, one or more updated parameters for the model configuration based on the measurement of the condition of the channel between the first network entity and the second network entity in comparison to the model condition based on the model configuration. The network entity 1102 further includes means for tracking the model condition of the channel between the first network entity and the second network entity after transmission of the reference signal to the first network entity based on the model configuration associated with the one or more initial parameters. The network entity 1102 further includes means for receiving, from the first network entity based on a local event, at least one of a request for communicating with the first network entity over a different channel or a recommendation for a different set of one or more parameters. The network entity 1102 further includes means for transmitting at least one of a confirmation of the request for communicating with the first network entity over the different channel or a second model configuration associated with the different set of one or more parameters. The network entity 1102 further includes means for updating the one or more initial parameters to the one or more updated parameters after receiving the one or more updated parameters for the model configuration from the first network entity.

The means may be the component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

The following aspects are illustrative only and may be combined with other aspects or teachings described herein, without limitation.

Aspect 1 is a method of wireless communication at a first network entity, including: receiving from a second network entity or transmitting to the second network entity, a model configuration indicative of a model condition of a channel between the first network entity and the second network entity, the model configuration associated with one or more initial parameters; receiving a reference signal from the second network entity to measure a condition of the channel between the first network entity and the second network entity; and transmitting, to the second network entity, one or more updated parameters for the model configuration based on a measurement of the condition of the channel between the first network entity and the second network entity in comparison to the model condition of the channel based on the model configuration.

Aspect 2 may be combined with aspect 1 and further includes measuring the condition of the channel between the first network entity and the second network entity based on the reference signal received from the second network entity and the model configuration associated with the one or more initial parameters.

Aspect 3 may be combined with any of aspects 1-2 and further includes tracking the condition of the channel between the first network entity and the second network entity in comparison to the model condition of the channel after measuring the condition of the channel based on the reference signal received from the second network entity and the model configuration associated with the one or more initial parameters.

Aspect 4 may be combined with any of aspects 1-3 and includes that the one or more updated parameters for the model configuration is transmitted to the second network entity based on detection of a local event at the first network entity.

Aspect 5 may be combined with any of aspects 1-4 and includes that the local event includes at least one of a mobility change, a first change in the condition of the channel, or a second change to a device condition associated with the first network entity.

Aspect 6 may be combined with any of aspects 1-5 and further includes transmitting, to the second network entity based on a detection of a local event at the first network entity, at least one of a request for communicating with the second network entity over a different channel or a recommendation for a different set of one or more parameters.

Aspect 7 may be combined with any of aspects 1-6 and further includes receiving at least one of a confirmation of the request for communicating with the second network entity over the different channel or a second model configuration associated with the different set of one or more parameters.

Aspect 8 may be combined with any of aspects 1-7 and includes that the model configuration is received during a setup procedure between the first network entity and the second network entity.

Aspect 9 may be combined with any of aspects 1-8 and includes that the one or more updated parameters for the model configuration is transmitted to the second network entity during a CSI feedback procedure.

Aspect 10 may be combined with any of aspects 1-9 and includes that the condition of the channel between the first network entity and the second network entity is associated with a mapping between a state vector and at least one of the channel or the condition of the channel.

Aspect 11 may be combined with any of aspects 1-10 and includes that the condition of the channel between the first network entity and the second network entity is tracked based on a CSI update algorithm.

Aspect 12 may be combined with any of aspects 1-11 and includes that the one or more updated parameters is transmitted to the second network entity as a trigger condition for updating the model configuration at the second network entity.

Aspect 13 may be combined with any of aspects 1-12 and includes that the condition of the channel between the first network entity and the second network entity includes a state change, the one or more updated parameters for the model configuration corresponding to the state change.

Aspect 14 may be combined with any of aspects 1-13 and includes that the first network entity is a UE or an entity at a base station.

Aspect 15 is a method of wireless communication at a second network entity, including: transmitting to a first network entity or receiving from the first network entity, a model configuration indicative of a model condition of a channel between the first network entity and the second network entity, the model configuration associated with one or more initial parameters; transmitting a reference signal to the first network entity for a measurement of a condition of the channel between the first network entity and the second network entity; and receiving, from the first network entity, one or more updated parameters for the model configuration based on the measurement of the condition of the channel between the first network entity and the second network entity in comparison to the model condition based on the model configuration.

Aspect 16 may be combined with aspect 15 and further includes tracking the model condition of the channel between the first network entity and the second network entity after transmission of the reference signal to the first network entity based on the model configuration associated with the one or more initial parameters.

Aspect 17 may be combined with any of aspects 15-16 and includes that the one or more updated parameters for the model configuration is received from the first network entity based on a local event at the first network entity.

Aspect 18 may be combined with any of aspects 15-17 and further includes receiving, from the first network entity based on a local event, at least one of a request for communicating with the first network entity over a different channel or a recommendation for a different set of one or more parameters.

Aspect 19 may be combined with any of aspects 15-18 and further includes transmitting at least one of a confirmation of the request for communicating with the first network entity over the different channel or a second model configuration associated with the different set of one or more parameters.

Aspect 20 may be combined with any of aspects 15-19 and includes that the model configuration is transmitted during a setup procedure between the first network entity and the second network entity.

Aspect 21 may be combined with any of aspects 15-20 and includes that the one or more updated parameters for the model configuration is received from the first network entity during a CSI feedback procedure.

Aspect 22 may be combined with any of aspects 15-21 and includes that the condition of the channel between the first network entity and the second network entity is associated with a mapping between a state vector and at least one of the channel or the condition of the channel.

Aspect 23 may be combined with any of aspects 15-22 and includes that the condition of the channel between the first network entity and the second network entity is tracked based on a CSI update algorithm.

Aspect 24 may be combined with any of aspects 15-23 and further includes updating the one or more initial parameters to the one or more updated parameters after receiving the one or more updated parameters for the model configuration from the first network entity.

Aspect 25 may be combined with any of aspects 15-24 and includes that the condition of the channel between the first network entity and the second network entity includes a state change, the one or more updated parameters for the model configuration corresponding to the state change.

Aspect 26 may be combined with any of aspects 15-25 and includes that the second network entity is a UE or an entity at base station.

Aspect 27 is an apparatus for wireless communication for implementing a method as in any of aspects 1-26.

Aspect 28 is an apparatus for wireless communication including means for implementing a method as in any of aspects 1-26.

Aspect 29 may be combined with any of aspects 27-28 and further includes at least one of a transceiver or an antenna coupled to at least one processor of the apparatus.

Aspect 30 is a non-transitory computer-readable medium storing computer executable code, the code when executed by at least one processor causes the at least one processor to implement a method as in any of aspects 1-26.

What is claimed is:

1. An apparatus for wireless communication at a first network entity, comprising:
a memory; and
at least one processor coupled to the memory and, based at least in part on information stored in the memory, the at least one processor is configured to:
receive from a second network entity or transmit to the second network entity, a model configuration indicative of a model condition of a channel between the first network entity and the second network entity, the model configuration associated with one or more initial parameters;
receive a reference signal from the second network entity to measure a condition of the channel between the first network entity and the second network entity;
measure the condition of the channel between the first network entity and the second network entity based on the reference signal received from the second network entity and the model configuration associated with the one or more initial parameters;
track the condition of the channel between the first network entity and the second network entity in comparison to the model condition of the channel after measuring the condition of the channel based on the reference signal received from the second network entity and the model configuration associated with the one or more initial parameters; and
transmit, to the second network entity, one or more updated parameters for the model configuration based on a measurement of the condition of the channel between the first network entity and the second network entity in the comparison to the model condition of the channel based on the model configuration.

2. The apparatus of claim 1, wherein the one or more updated parameters for the model configuration is transmitted to the second network entity based on a detection of a local event at the first network entity.

3. The apparatus of claim 1, wherein the model configuration is received during a setup procedure between the first network entity and the second network entity.

4. The apparatus of claim 1, wherein the one or more updated parameters for the model configuration is transmitted to the second network entity during a channel state information (CSI) feedback procedure.

5. The apparatus of claim 1, wherein the condition of the channel between the first network entity and the second network entity is associated with a mapping between a state vector and at least one of the channel or the condition of the channel.

6. The apparatus of claim 1, wherein the condition of the channel between the first network entity and the second network entity is tracked based on a channel state information (CSI) update algorithm.

7. The apparatus of claim 1, wherein the one or more updated parameters is transmitted to the second network entity as a trigger condition for updating the model configuration at the second network entity.

8. The apparatus of claim 1, wherein the condition of the channel between the first network entity and the second network entity includes a state change, the one or more updated parameters for the model configuration corresponding to the state change.

9. The apparatus of claim 1, wherein the first network entity is a user equipment (UE) or an entity at a base station.

10. The apparatus of claim 1, further comprising at least one of a transceiver or an antenna coupled to the at least one processor.

11. An apparatus for wireless communication at a first network entity, comprising:
a memory; and
at least one processor coupled to the memory and, based at least in part on information stored in the memory, the at least one processor is configured to:
receive from a second network entity or transmit to the second network entity, a model configuration indicative of a model condition of a channel between the first network entity and the second network entity, the model configuration associated with one or more initial parameters;
receive a reference signal from the second network entity to measure a condition of the channel between the first network entity and the second network entity; and
transmit, to the second network entity based on a detection of a local event at the first network entity, one or more updated parameters for the model configuration based on a measurement of the condition of the channel between the first network entity and the second network entity in comparison to the model condition of the channel based on the model configuration, wherein the local event includes at least one of a mobility change, a first change in the condition of the channel, or a second change to a device condition associated with the first network entity.

12. An apparatus for wireless communication at a first network entity, comprising:
a memory; and
at least one processor coupled to the memory and, based at least in part on information stored in the memory, the at least one processor is configured to:
receive from a second network entity or transmit to the second network entity, a model configuration indicative of a model condition of a channel between the first network entity and the second network entity, the model configuration associated with one or more initial parameters;
receive a reference signal from the second network entity to measure a condition of the channel between the first network entity and the second network entity;
transmit, to the second network entity, one or more updated parameters for the model configuration based on a measurement of the condition of the channel between the first network entity and the second network entity in comparison to the model condition of the channel based on the model configuration; and
transmit, to the second network entity based on a detection of a local event at the first network entity, at least one of a request for communicating with the second network entity over a different channel or a recommendation for a different set of one or more parameters.

13. The apparatus of claim 12, wherein the at least one processor is further configured to receive at least one of a confirmation of the request for communicating with the second network entity over the different channel or a second model configuration associated with the different set of one or more parameters.

14. An apparatus for wireless communication at a second network entity, comprising:
a memory; and
at least one processor coupled to the memory and, based at least in part on information stored in the memory, the at least one processor is configured to:
transmit to a first network entity or receive from the first network entity, a model configuration indicative of a model condition of a channel between the first network entity and the second network entity, the model configuration associated with one or more initial parameters;
transmit a reference signal to the first network entity for a measurement of a condition of the channel between the first network entity and the second network entity;
receive, from the first network entity, one or more updated parameters for the model configuration based on the measurement of the condition of the channel between the first network entity and the second network entity in comparison to the model condition based on the model configuration; and
receive, from the first network entity based on a local event, at least one of a request for communicating with the first network entity over a different channel or a recommendation for a different set of one or more parameters.

15. The apparatus of claim 14, wherein the at least one processor is further configured to track the model condition of the channel between the first network entity and the second network entity after transmission of the reference signal to the first network entity based on the model configuration associated with the one or more initial parameters.

16. The apparatus of claim 14, wherein the one or more updated parameters for the model configuration is received from the first network entity based on the local event at the first network entity.

17. The apparatus of claim 14, wherein the at least one processor is further configured to transmit at least one of a confirmation of the request for communicating with the first network entity over the different channel or a second model configuration associated with the different set of one or more parameters.

18. The apparatus of claim 14, wherein the model configuration is transmitted during a setup procedure between the first network entity and the second network entity.

19. The apparatus of claim 14, wherein the one or more updated parameters for the model configuration is received from the first network entity during a channel state information (CSI) feedback procedure.

20. The apparatus of claim 14, wherein the condition of the channel between the first network entity and the second network entity is associated with a mapping between a state vector and at least one of the channel or the condition of the channel.

21. The apparatus of claim 14, wherein the condition of the channel between the first network entity and the second network entity is tracked based on a channel state information (CSI) update algorithm.

22. The apparatus of claim 14, wherein the at least one processor is further configured to update the one or more initial parameters to the one or more updated parameters after receiving the one or more updated parameters for the model configuration from the first network entity.

23. The apparatus of claim 14, wherein the condition of the channel between the first network entity and the second network entity includes a state change, the one or more updated parameters for the model configuration corresponding to the state change.

24. The apparatus of claim 14, wherein the second network entity is a user equipment (UE) or an entity at base station.

25. The apparatus of claim 14, further comprising at least one of a transceiver or an antenna coupled to the at least one processor.

26. A method of wireless communication at a first network entity, comprising:
receiving from a second network entity or transmit to the second network entity, a model configuration indicative of a model condition of a channel between the first network entity and the second network entity, the model configuration associated with one or more initial parameters;
receiving a reference signal from the second network entity to measure a condition of the channel between the first network entity and the second network entity;
measuring the condition of the channel between the first network entity and the second network entity based on the reference signal received from the second network entity and the model configuration associated with the one or more initial parameters;
tracking the condition of the channel between the first network entity and the second network entity in comparison to the model condition of the channel after measuring the condition of the channel based on the reference signal received from the second network entity and the model configuration associated with the one or more initial parameters; and
transmitting, to the second network entity, one or more updated parameters for the model configuration based on a measurement of the condition of the channel between the first network entity and the second network entity in the comparison to the model condition of the channel based on the model configuration.

27. A method of wireless communication at a second network entity, comprising:
transmitting to a first network entity or receive from the first network entity, a model configuration indicative of a model condition of a channel between the first network entity and the second network entity, the model configuration associated with one or more initial parameters;
transmitting a reference signal to the first network entity for a measurement of a condition of the channel between the first network entity and the second network entity;
receiving, from the first network entity, one or more updated parameters for the model configuration based on the measurement of the condition of the channel between the first network entity and the second network entity in comparison to the model condition based on the model configuration; and
receiving, from the first network entity based on a local event, at least one of a request for communicating with the first network entity over a different channel or a recommendation for a different set of one or more parameters.

* * * * *